Figure 9:
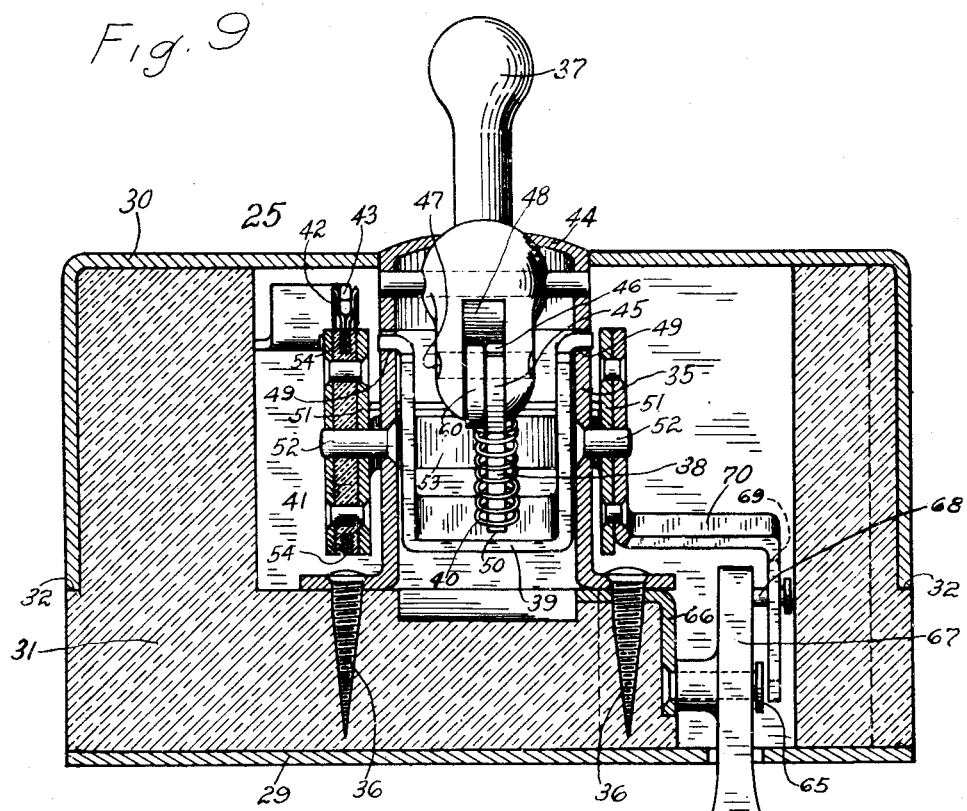

W. J. NEWTON.
PLURAL CONTROL MAGNETO AND SEMAPHORE SWITCH.
APPLICATION FILED OCT. 2, 1919.
1,357,585.
Patented Nov. 2, 1920.
3 SHEETS—SHEET 1.
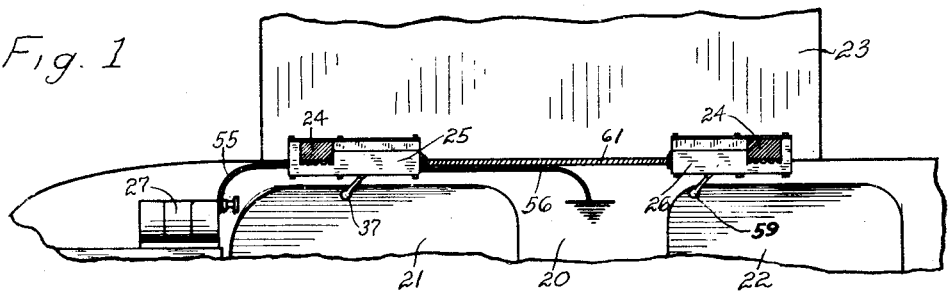
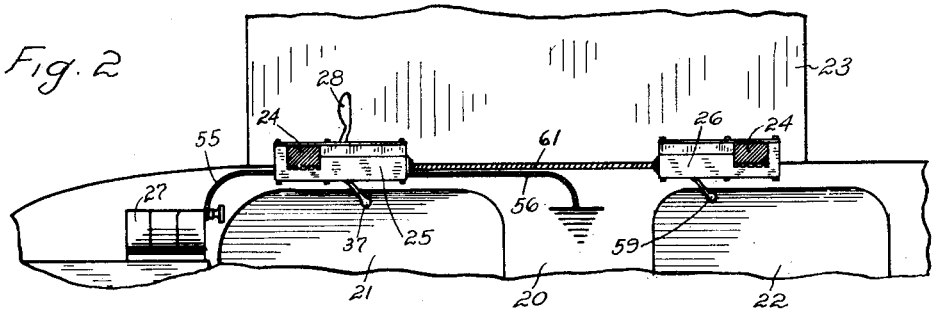
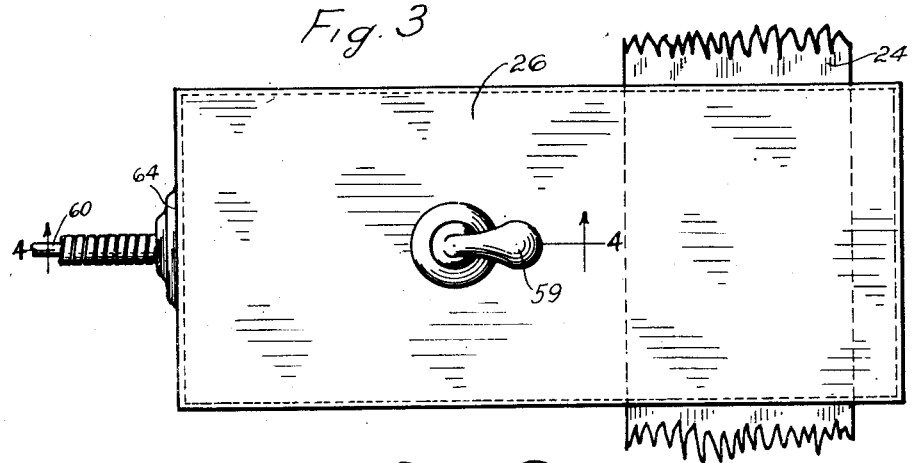
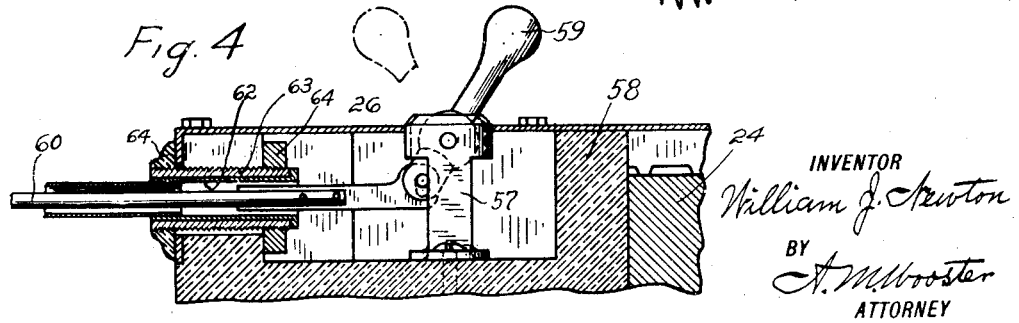
INVENTOR
William J. Newton
BY
A. M. Wooster
ATTORNEY

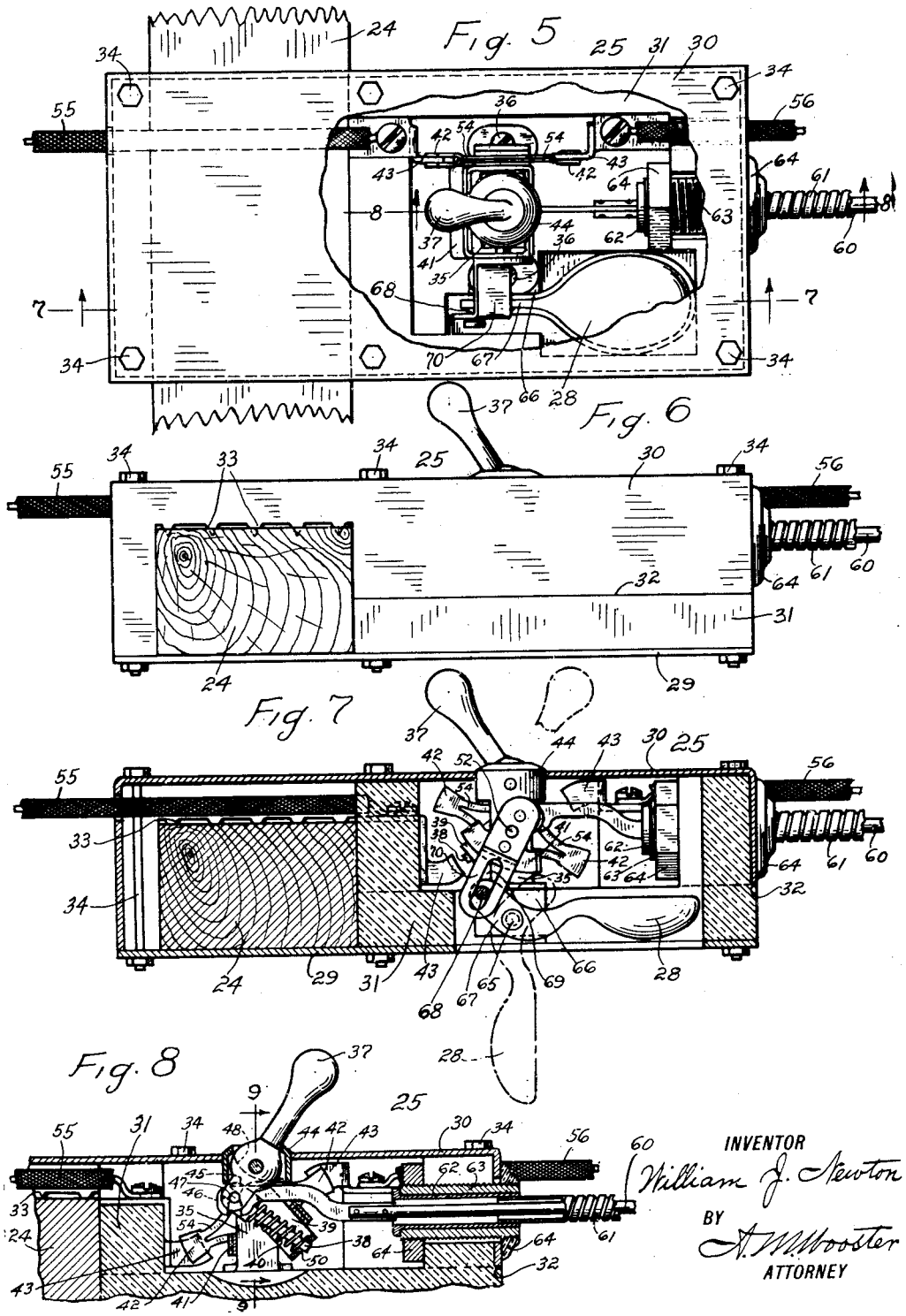

W. J. NEWTON.
PLURAL CONTROL MAGNETO AND SEMAPHORE SWITCH.
APPLICATION FILED OCT. 2, 1919.

1,357,585.

Patented Nov. 2, 1920.
3 SHEETS—SHEET 3.

INVENTOR
William J. Newton
BY
A. M. Wooster
ATTORNEY

UNITED STATES PATENT OFFICE.

WILLIAM J. NEWTON, OF BRIDGEPORT, CONNECTICUT, ASSIGNOR TO HARVEY HUBBELL, INCORPORATED, OF BRIDGEPORT, CONNECTICUT, A CORPORATION OF CONNECTICUT.

PLURAL-CONTROL MAGNETO AND SEMAPHORE SWITCH.

1,357,585.    Specification of Letters Patent.    Patented Nov. 2, 1920.

Application filed October 2, 1919. Serial No. 327,869.

*To all whom it may concern:*

Be it known that I, WILLIAM J. NEWTON, a citizen of the United States, residing at Bridgeport, county of Fairfield, State of Connecticut, have invented an Improvement in Plural-Control Magneto and Semaphore Switches, of which the following is a specification.

This invention has for its object to provide a switch and controlling mechanism therefor adapted for use wherever a plural control is required or where it is required to perform two acts simultaneously by a single movement, as the closing of an electric circuit and the simultaneous giving of a signal, the invention being especially adapted for use in airplanes where it is desirable to provide means for closing the magneto circuit and operating a semaphore simultaneously and where it is also required that these acts may be performed either by the pilot or by a mechanician or observer sitting at a distance from the pilot.

It is of course well understood that in starting an airplane the pilot ordinarily takes his seat and another, who may be the mechanician or a helper, spins the propeller. The next move is for the pilot to close the magneto circuit. It is extremely desirable that the person who spins the propeller should be informed of the fact the instant the magneto circuit is closed in order that he may get out of the way of the propeller blades, and if he is to be the mechanician of the trip that he may take his seat in the body as quickly as possible. As it is difficult at all times and frequently impossible for the pilot to communicate orally with the starter, I have devised a construction which renders it impossible for the pilot to close the magneto circuit without also operating a semaphore, and in addition I provide a construction which gives a plural control of the magneto circuit, so that either the pilot or his mechanician may open or close the magneto circuit at any time. In other words the semaphore will tell at all times whether the magneto circuit is open or closed.

Figure 10:
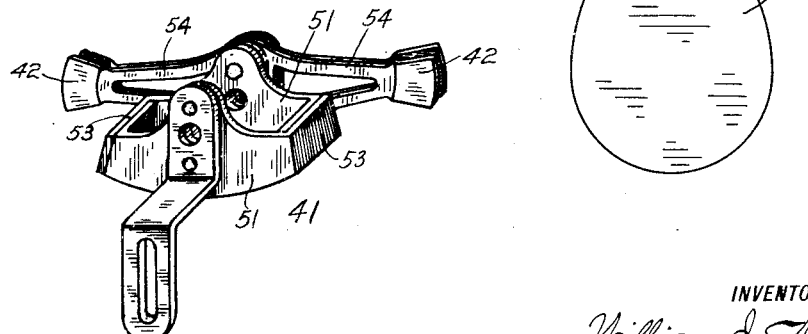

In the accompanying drawings forming a part of this specification Figure 1 is a fragmentary plan view of so much of an airplane body as is necessary to illustrate the application thereto of the present invention, the operating levers being in the open circuit position and the semaphore not in view;

Fig. 2 a similar view, the operating levers being in the closed circuit position and the semaphore in view;

Fig. 3 an elevation on an enlarged scale, corresponding with Fig. 2, of the rear control box;

Fig. 4 a section on the line 4—4 in Fig. 3, looking in the direction of the arrows;

Fig. 5 an elevation, on an enlarged scale, corresponding with Fig. 1, of the front control or switch box, the face plate being partly broken away;

Fig. 6 an edge view corresponding with Fig. 5, as seen from below;

Fig. 7 a section on the line 7—7 in Fig. 5, looking in the direction of the arrows;

Fig. 8 a section on the line 8—8 in Fig. 5, but showing the parts in the closed circuit position;

Fig. 9 a section on a still larger scale, on the line 9—9 in Fig. 8, looking in the direction of the arrow, and Fig. 10 is a perspective view of the contact member detached.

20 denotes the body of an airplane, 21 the forward pit, in which the pilot is seated, 22 the rear pit, in which the mechanician or observer is seated, 23 one of the planes, 24 struts, 25 the forward control box, 26 the rear control box, 27 the magneto, and 28 the semaphore.

The forward control box comprises a bottom plate 29, a cap plate 30 and an insulating block 31 which partly fills the box and is recessed to receive the switch and co-operating parts. As shown in the drawings the block is provided with a shoulder 32 against which the edge of the cap plate rests. The side flanges of the cap plate are recessed to receive the strut and are provided with prongs 33, see Fig. 7, which engage the strut, one edge of the insulating block resting against the side of the strut and the plates of the box being clamped together by bolts 34, four of which pass through the insulating block.

As it is necessary that the switch should provide a practically instantaneous make and break of the magneto circuit, I preferably use a switch of the hammer blow type, such as described and claimed in my pending application Serial No. 262,958, filed Nov. 18, 1918.

35 denotes the frame of the switch which is secured to the insulating block by screws 36. The important elements of the switch are the operating lever 37, the toggle arm 38, the actuating member 39, the spring 40, the contact member 41, contacts 42 carried by said member, and fixed contact 43 which are secured to the frame.

The operating lever is pivoted in a hub 44, forming part of the frame, and is a lever of the first order. The toggle joint consists of the inner arm of the operating lever and toggle arm 38. The toggle arm is provided with a head 45 having a notch 46 which receives a cross pin 47 bridging a slot 48 in the inner end of the operating lever. The actuating member comprises a strip of metal bent to U-shape, the branches of which are pivoted to the frame, as at 49. The inner end of the toggle arm passes through a hole 50 in the cross piece of the actuating member. The spring which is a relatively strong compression spring, surrounds the toggle arm and bears against the head of said arm and against the cross piece of the actuating member.

The general shape of the contact member will be clearly understood from Fig. 10. It comprises broadly side pieces 51 which are pivoted to the frame, as at 52, and spaced apart cross pieces 53, which connect the side pieces. The actuating member lies between the side pieces of the frame, and the side pieces of the contact member are pivoted on the outer side of the side pieces of the frame. The cross pieces of the contact member are spaced apart far enough to give full effect to the blows of the actuating member. Contacts 42 are formed at the ends of metallic strips 54 which are effectually insulated. 55 denotes an electric connection from the magneto to one of the fixed contacts and 56 an electric connection leading from the other fixed contact and suitably grounded.

When the operating member is swung toward the center from either the full line or dotted position, in Fig. 7, the spring will be compressed and the toggle will be moved toward its neutral position. The actuating member will move away from the cross piece of the contact member with which it has been in engagement, but no movement can be imparted to the contact member until the toggle has passed its neutral position. The entire expansive power of the spring will then be exerted to cause the actuating member to move forward instantly and strike a relatively powerful blow upon the other cross piece of the contact member, the effect of which is to throw the contact member instantly to the other extreme of its movement and either open or close the magneto circuit. It should be noted that no movement of the contact member can be produced except by a blow of the actuating member, so that the danger of arcing is practically eliminated. The side pieces of the frame are engaged by the cross pieces of the contact member to limit the movement of the contact member in either direction.

The essential features of the rear control box are a frame 57, which is similar to frame 35 and incloses an insulating block 58, a secondary operating lever 59, corresponding with operating lever 37, and a rigid connection 60 between said levers. One end of this connection is loosely pivoted to secondary operating levers 59, see Fig. 4, the other end loosely engaging cross pin 47 which bridges slot 48 in operating lever 37, see Figs. 8 and 9. Connection 60 passes through a tube 61, the ends of which are connected to bushings 62 having at their inner ends heads which engage the ends of threaded sleeves 63. The ends of the threaded sleeves are engaged by nuts 64, one of which bears against the flange of the corresponding cap plate, which in turn bears against the insulating block, and the other nut bears against the insulating block. Should tube 61 require tightening up such adjustment may be made by means of the nuts. When either of the threaded sleeves is drawn inward, that is in the direction away from the other, the corresponding bushing will be drawn inward also through the engagement of its head with the end of the sleeve, and the tube, which is secured to the bushings, will be tightened.

The semaphore is pivoted on a stud 65 extending from a bracket 66 which is secured to insulating block 31. In the present instance the bracket is shown as lying under one leg of frame 35 and secured in place by one of the screws 36. The semaphore is provided with an arm 67 extending beyond its pivotal point and the arm is provided with a pin 68 which engages a slot 69 in an arm 70, the other end of which is offset and is rigidly secured to one of the side pieces of the contact member, see Fig. 10 in connection with Fig. 7.

It will be seen, therefore, that the present invention provides instantaneous means for opening and closing the magneto circuit which can be operated with equal facility from a plurality of positions, in the present instance two. As the connection between the switch operating lever and the secondary operating lever is rigid it follows that operation of the secondary operating lever must necessarily operate the switch and the switch operating lever, so that the two levers must always be in the same relative position, their angle at inclination indicating whether the magneto circuit is open or closed, and the semaphore, which is positively connected to the contact member, will at all times indicate to persons outside the plane whether or not the magneto circuit is closed, as said circuit cannot be closed without placing the semaphore in view.

Having thus described my invention, I claim:

1. In combination an electric switch, an operating lever therefor, a corresponding secondary operating lever, a rigid connection between said levers, a pivoted semaphore, and connections between the semaphore and the switch operating lever, whereby operation of the switch will cause actuation of the semaphore.

2. In combination fixed contacts, a swinging contact member, an actuating member, an operating lever, a spring controlled toggle connection between the operating lever and the actuating member, a secondary actuating lever and a rigid connection between said levers.

3. In combination fixed contacts, a swinging contact member, an actuating member, an operating lever, a spring controlled toggle connection between the operating lever and the actuating member, a secondary actuating lever, a rigid connection between said levers, a pivoted semaphore and operating connections between the semaphore and the switch operating lever.

4. In combination a frame, a contact member comprising side pieces pivoted to the frame and spaced apart cross pieces, an actuating member independently pivoted to the frame and lying between said cross pieces, an operating lever, a toggle arm pivoted to the operating lever and having sliding connection with the actuating member, a compression spring carried by the toggle arm and bearing against the actuating member, a secondary operating lever and a rigid connection between said levers.

5. In combination a frame, a contact member comprising side pieces pivoted to the frame and spaced apart cross pieces, an actuating member independently pivoted to the frame and lying between said cross pieces, an operating lever, a toggle arm pivoted to the operating lever and having sliding connection with the actuating member, a compression spring carried by the toggle arm and bearing against the actuating member, a secondary operating lever, a rigid connection between said levers, a pivoted semaphore, and operating connections between the semaphore and the switch operating lever.

6. In combination a swinging contact member, a swinging actuating member, spring controlled toggle mechanism which normally retains said members at one extreme of their movement and causes the actuating member to strike a blow upon the contact member and carry said member to the opposite extreme of its movement when the toggle mechanism is swung past its neutral position, a pivoted semaphore, and operating connections whereby actuation of the contact member will cause operation of the semaphore.

7. In combination a swinging contact member, a swinging actuating member, spring controlled toggle mechanism acting on the actuating member to normally retain both members at one extreme of their movement and causing the actuating member to strike a blow upon the contact member when the toggle is swung past its neutral position, an operating lever which controls the toggle mechanism, a secondary operating lever and a rigid connection between said levers.

8. In combination a swinging contact member, a swinging actuating member, spring controlled toggle mechanism acting on the actuating member to normally retain both members at one extreme of their movement and causing the acutating member to strike a blow upon the contact member when the toggle is swung past its neutral position, an operating lever which controls the toggle mechanism, a secondary operating lever, a rigid connection between said levers, a pivoted semaphore, and operating connections between the semaphore and the switch operating lever.

9. In combination an electric switch, an operating lever therefor, a secondary operating lever, a rigid connection between said levers, a tube in which said connection is inclosed, bushings to which the ends of the tube are connected and means for adjusting the bushings to tighten the tube.

10. In combination an electric switch, an operating lever therefor, a secondary operating lever, a rigid connection between said levers, a tube in which said connection is inclosed, bushings to which the ends of the tube are connected, means for adjusting the bushings to tighten the tube, a pivoted semaphore and operating connections between said semaphore and the switch operating lever.

11. In combination a frame; a contact member comprising side pieces pivoted to the frame and spaced apart cross pieces, an actuating member independently pivoted to the frame and lying between said cross pieces, an operating lever, a toggle arm pivoted to the operating lever and having sliding connection with the actuating member, a compression spring carried by the toggle arm and bearing against the actuating member, a secondary operating lever, a rigid connection between said levers, an offset arm secured to one of the side pieces of the contact member, a pivoted semaphore and an operating connection between said arm and the semaphore.

12. In combination an electric switch, an operating lever therefor, a secondary operating lever, a rigid connection between said levers, a tube inclosing said connection means for tightening said tube, a semaphore, and operating connections whereby operation of the switch is caused to actuate the semaphore.

In testimony whereof I affix my signature.

WILLIAM J. NEWTON.